US009890714B2

United States Patent
Soni et al.

(10) Patent No.: US 9,890,714 B2
(45) Date of Patent: Feb. 13, 2018

(54) AUTOMATED EXTENDED TURNDOWN OF A GAS TURBINE ENGINE COMBINED WITH INCREMENTAL TUNING TO MAINTAIN EMISSIONS AND DYNAMICS

(71) Applicant: ANSALDO ENERGIA IP UK LIMITED, London (GB)

(72) Inventors: Sumit Soni, Jupiter, FL (US); Nicolas Roger Demougeot, Stuart, FL (US); Peter John Stuttaford, Jupiter, FL (US)

(73) Assignee: ANSALDO ENERGIA IP UK LIMITED (GB)

( * ) Notice: Subject to any disclaimer, the term of this patent is extended or adjusted under 35 U.S.C. 154(b) by 384 days.

(21) Appl. No.: 14/610,760

(22) Filed: Jan. 30, 2015

(65) Prior Publication Data
US 2015/0159563 A1 Jun. 11, 2015

Related U.S. Application Data

(63) Continuation-in-part of application No. 12/786,189, filed on May 24, 2010, now Pat. No. 9,097,185.
(Continued)

(51) Int. Cl.
*F02C 9/28* (2006.01)
*F02C 7/228* (2006.01)
(Continued)

(52) U.S. Cl.
CPC .............. *F02C 9/28* (2013.01); *F02C 7/228* (2013.01); *F02C 9/34* (2013.01); *F23R 3/343* (2013.01);
(Continued)

(58) Field of Classification Search
CPC .... F02C 7/228; F02C 9/28; F02C 9/32; F02C 9/34; F05D 2260/80; F05D 2270/05;
(Continued)

(56) References Cited

U.S. PATENT DOCUMENTS 2,926,524 A 3/1960 Sanders
3,080,885 A 3/1963 Webster et al.
(Continued)

FOREIGN PATENT DOCUMENTS

EP 1331448 A2 7/2003
EP 1533569 A1 5/2005
(Continued)

OTHER PUBLICATIONS

International Search Report with Written Opinion dated Apr. 25, 2016 in PCT Patent Application No. PCT/US16/15959, 11 pages.
(Continued)

*Primary Examiner* — Pascal M Bui Pho
*Assistant Examiner* — Kyle Thomas
(74) *Attorney, Agent, or Firm* — Hovey Williams LLP

(57) ABSTRACT

An auto-tune controller and tuning process implemented thereby for measuring and tuning the combustion dynamics and emissions of a GT engine, relative to predetermined upper limits, are provided. Initially, the tuning process includes monitoring the combustion dynamics of a plurality of combustors and emissions for a plurality of conditions. Upon determination that one or more of the conditions exceeds a predetermined upper limit, a fuel flow split to a fuel circuit on all of the combustors on the engine is adjusted by a predetermined amount. The control system continues to monitor the combustion dynamics and to recursively adjust the fuel flow split by the predetermined amount until the combustion dynamics and/or emissions are operating within a prescribed range of the GT engine. Additionally, a method
(Continued)

of automated extended turndown of a GT engine to find a minimum load is provided.

21 Claims, 8 Drawing Sheets

Related U.S. Application Data

(60) Provisional application No. 61/181,253, filed on May 26, 2009.

(51) Int. Cl.
*F02C 9/34* (2006.01)
*F23R 3/34* (2006.01)

(52) U.S. Cl.
CPC .......... *F23R 3/346* (2013.01); *F05D 2260/80* (2013.01); *F05D 2270/05* (2013.01); *F05D 2270/082* (2013.01); *F05D 2270/301* (2013.01); *F05D 2270/31* (2013.01); *F23N 2041/20* (2013.01); *F23R 2900/00013* (2013.01)

(58) Field of Classification Search
CPC .......... F05D 2270/301; F05D 2270/31; F05D 2270/053; F23N 2041/20; F23R 2900/00013; F23R 3/343; F23R 3/346; F05B 2270/1033
See application file for complete search history.

(56) References Cited

U.S. PATENT DOCUMENTS

| | | | |
|---|---|---|---|
| 5,699,663 A | 12/1997 | Capelle et al. | |
| 6,195,607 B1* | 2/2001 | Rajamani | F02C 7/22 60/39.37 |
| 6,535,124 B1 | 3/2003 | Ditommaso et al. | |
| 6,742,341 B2 | 6/2004 | Ryan et al. | |
| 6,810,655 B2 | 11/2004 | Davis, Jr. et al. | |
| 6,823,675 B2 | 11/2004 | Brunell et al. | |
| 6,877,307 B2 | 4/2005 | Ryan | |
| 6,955,039 B2 | 10/2005 | Nomura et al. | |
| 6,973,791 B2 | 12/2005 | Handelsman et al. | |
| 6,976,351 B2 | 12/2005 | Catharine et al. | |
| 7,024,862 B2 | 4/2006 | Miyake et al. | |
| 7,121,097 B2 | 10/2006 | Yee et al. | |
| 7,188,019 B2 | 3/2007 | Nomura et al. | |
| 7,210,297 B2 | 5/2007 | Shah et al. | |
| 7,234,305 B2 | 6/2007 | Nomura et al. | |
| 7,269,939 B2 | 9/2007 | Kothnur et al. | |
| 7,269,952 B2 | 9/2007 | Arar et al. | |
| 7,269,953 B2 | 9/2007 | Gadde et al. | |
| 7,284,378 B2 | 10/2007 | Amond, III et al. | |
| 7,302,334 B2 | 11/2007 | Hook et al. | |
| 7,441,398 B2 | 10/2008 | Ziminsky et al. | |
| 8,061,118 B2 | 11/2011 | Kothnur et al. | |
| 2003/0014219 A1 | 1/2003 | Shimizu et al. | |
| 2004/0011051 A1 | 1/2004 | Ryan et al. | |
| 2004/0123653 A1 | 7/2004 | Benson | |
| 2006/0254279 A1 | 11/2006 | Taware et al. | |
| 2007/0113563 A1 | 5/2007 | Mulera et al. | |
| 2009/0005952 A1 | 1/2009 | Tonno et al. | |
| 2009/0094984 A1 | 4/2009 | Colket et al. | |
| 2009/0125207 A1 | 5/2009 | Nomura et al. | |
| 2009/0222187 A1 | 9/2009 | Martling et al. | |
| 2010/0215480 A1* | 8/2010 | Leach | F02C 9/18 415/145 |
| 2010/0286890 A1 | 11/2010 | Chandler | |
| 2011/0137536 A1 | 6/2011 | Tonno et al. | |
| 2012/0023953 A1* | 2/2012 | Thomas | F02C 7/228 60/772 |
| 2012/0275899 A1* | 11/2012 | Chandler | F02C 9/28 415/1 |
| 2012/0279230 A1* | 11/2012 | Botarelli | F02C 9/00 60/773 |
| 2014/0200721 A1* | 7/2014 | Rizkalla | F02C 7/228 700/282 |

FOREIGN PATENT DOCUMENTS

| | | |
|---|---|---|
| EP | 1632718 A2 | 3/2006 |
| GB | 2434437 A | 7/2007 |
| JP | H08270461 A | 10/1996 |
| JP | 2003314305 A | 11/2003 |
| JP | 2004316506 A | 11/2004 |
| JP | 2006144796 A | 6/2006 |
| KR | 1020117030843 | 12/2014 |

OTHER PUBLICATIONS

Notice of Allowance dated Mar. 23, 2015 in U.S. Appl. No. 12/786,189, 8 pages.
International Search Report with Written Opinion dated Sep. 7, 2010 in PCT Application No. PCT/US2010/036069, 13 pages.
International Search Report with Written Opinion dated Aug. 16, 2011 in PCT Application No. PCT/US2011/033925, 14 pages.
International Preliminary Report on Patentability dated Oct. 3, 2011 in PCT Application No. PCT/US2010/36069, 7 pages.
Non-Final Office Action dated Sep. 27, 2011 in U.S. Appl. No. 12/786,189, 14 pages.
Final Office Action dated Mar. 21, 2012 in U.S. Appl. No. 12/786,189, 16 pages.
Non-Final Office Action dated Sep. 17, 2013 in U.S. Appl. No. 12/786,189, 16 pages.
Final Office Action dated Jan. 28, 2014 in U.S. Appl. No. 12/786,189, 16 pages.
Non-Final Office Action dated Nov. 9, 2014 in U.S. Appl. No. 12/786,189, 20 pages.

* cited by examiner

200 ↘
221  231  232

| FUEL SCHEDULE TYPE | | | |
|---|---|---|---|
| TO ↓ PARAM. A | TO ↓ PARAM. B | TO ↓ PARAM. C | TO ↓ PARAM. D |
| ↑ SPLIT 1    (1) | ↓ SPLIT 1    (2) | ↑ SPLIT 1    (3) | ↓ SPLIT 1    (1) |
| ↑ SPLIT 2    (3) | ↑ SPLIT 2    (1) | ↓ SPLIT 2    (1) | ↑ SPLIT 2    (2) |
| ↓ SPLIT 3    (2) | ↓ SPLIT 3    (3) | ↑ SPLIT 3    (2) | ↑ SPLIT 3    (3) |

210 { (FUEL SCHEDULE TYPE row)
220 { (TO ↓ PARAM row)
230 { (SPLIT rows)
233 ↗  250 ↖

| PARAMETER A | PARAMETER B |
|---|---|
| INCREASE FUEL FLOW SPLIT | DECREASE FUEL FLOW SPLIT |

310 { (header row)
320 { (data row)

AUTOMATED EXTENDED TURNDOWN OF A GAS TURBINE ENGINE COMBINED WITH INCREMENTAL TUNING TO MAINTAIN EMISSIONS AND DYNAMICS

CROSS REFERENCE TO RELATED APPLICATIONS

This Nonprovisional Patent Application is a continuation-in-part of and claims priority to U.S. Nonprovisional application Ser. No. 12/786,189, filed May 24, 2010, entitled "STABILIZING A GAS TURBINE ENGINE VIA INCREMENTAL TUNING," which claims priority to U.S. Provisional Application No. 61/181,253, filed May 26, 2009, entitled "AUTO-TUNING OF A GAS TURBINE ENGINE," the teachings of which are incorporated herein by reference in their entirety.

TECHNICAL FIELD

The present invention generally relates to automatically tuning a gas turbine engine. More specifically, a process and system are identified for providing a control system to automatically tune the gas turbine engine by incrementally adjusting one or more fuel flow splits within a combustor, incrementally adjusting the gaseous fuel temperature, and/or by incremental reduction of a load supplied to the gas turbine engine combined with incremental tuning to maintain emission and dynamics of the gas turbine engine.

BACKGROUND OF THE INVENTION

Gas turbine engines operate to produce mechanical work or thrust. Specifically, land-based gas turbine engines typically have a generator coupled thereto for the purposes of generating electricity. The shaft of the gas turbine engine is coupled to the generator. Mechanical energy of the shaft is used to drive a generator to supply electricity to at least a power grid. The generator is in communication with one or more elements of a power grid through a main breaker. When the main breaker is closed, electrical current can flow from the generator to the power grid when there is a demand for the electricity. The drawing of electrical current from the generator causes a load to be applied to the gas turbine. This load is essentially a resistance applied to the generator that the gas turbine must overcome to maintain an electrical output of the generator.

Increasingly, a control system is used to regulate the operation of the gas turbine engine. In operation, the control system receives a plurality of indications that communicate the current operating conditions of the gas turbine engine including pressures, temperatures, fuel flow rates, and engine frequencies. In response, the control system makes adjustments to the inputs of the gas turbine engine, thereby changing performance of the gas turbine engine based on the plurality of indications in light of look-up tables coded into the memory of the control system. Over time, this performance may fall outside a preferred operating range due to mechanical degradation of the gas turbine engine or changes in operational conditions such as ambient temperature or fuel constituents. For instance, the gas turbine engine may start operating beyond regulated emissions limits. As such, multiple manual tunings are required to update the control system. Manual-tuning is labor intensive and can create business-related inefficiencies, such as extended down-time of the gas turbine engine and operator error in the course of tuning. In addition, because there are specific windows of time where manual tuning may not be available (e.g., high dynamics events), but where performing a tuning operation would be beneficial to protect against potential damage to hardware, automatically tuning during these windows captures the benefits typically missed when manual tuning is used.

SUMMARY

The subject matter of the various embodiments of the present invention is described with specificity in this disclosure to meet statutory requirements. However, the description is not intended to limit the scope of claims. Rather, the claimed subject matter may be embodied in various other ways to include different features, components, elements, combinations, and steps, similar to the ones described in this document, and in conjunction with other present and future technologies. Terms should not be interpreted as implying any particular order among or between various steps disclosed herein unless the stated order of steps is explicitly required. Many different arrangements of the various components depicted, as well as use of components not shown, are possible without departing from the scope of the claims below. Moreover, this summary is not intended to identify key features or essential features of the claimed subject matter, nor is it intended to be used as an aid in isolation to determine the scope of the claimed subject matter. The scope of the invention is defined by the claims.

In accordance with the present invention, there is provided a novel way of monitoring operating conditions of a gas turbine engine and responding to conditions which exceed predetermined upper limits. Additionally, there is provided a novel way of performing automatic extended turndown (AET) of a gas turbine (GT) engine by incremental reduction of load combined with incremental tuning to maintain emission and dynamics of the GT engine. Initially, various engine operating conditions and criteria can be monitored. By way of example, these operating conditions may include, but are not limited to, emissions, combustor dynamics modes, such as Lean Blow Out (LBO), Cold Tone (CT), Hot Tone (HT), and Screech. When a monitored operating condition exceeds one or more predetermined upper limits, an engine parameter may be changed to adjust this condition to bring it within the limits, thereby tuning the GT engine.

More specifically, pressure fluctuations, also called combustion dynamics, may be detected (e.g., utilizing pressure transducers) in each combustor of the GT engine. Next, a Fourier Transform may be applied to the pressure signals to convert the pressure signals into an amplitude versus frequency format. The maximum amplitude at a pre-determined frequency band, within a timeframe, may be compared against a pre-determined upper pressure limit, or alarm level limit. Incident to comparison, when it is ascertained that the upper pressure limit is exceeded by the maximum amplitude, an appropriate corrective action is taken. In some instances, the appropriate action is carried out manually. In another instance, the appropriate action is implemented by the control system. For instance, the control system may initiate a process of altering one or more fuel flow splits within a fuel circuit of the combustor, or initiate incremental reductions of load combined with incremental tuning. In an exemplary embodiment, one fuel flow split is altered at a time by a predefined increment. As described herein, the phrase "predefined increment" is not meant to be construed as limiting, but may encompass a wide range of adjustments to the fuel flow splits. In one instance, the predefined increment is a uniform amount of adjustment that is consistently applied to one or more of the fuel flow splits. In another instance, the predefined amount is a varied amount of adjustment that is altered across fuel flow splits or across individual adjustments to a particular fuel flow split. By altering the fuel flow splits in this manner, the fuel-air mixing within the combustor is changed, thus, affecting the combustion signature. Upon affecting the combustion signature, the pressure fluctuations are altered.

This altered combustion dynamics amplitude, once stabilized, is again compared against the predetermined upper limit to verify whether the adjusted fuel flow split has moved the amplitude within an acceptable range. If the amplitude remains over the predetermined upper limit, the fuel flow split is once again adjusted by the predefined increment and the process is recursively repeated as necessary. Advantageously, changes are made to the fuel flow split consistently and uniformly at the same predetermined increment, thereby saving processing time to compute a customized value of an increment each time the predetermined upper limit is exceeded.

Accordingly, in an exemplary embodiment of the process of auto-tuning, a control system for monitoring and controlling the GT engine is provided. This control system generally manages a majority of the processes involves with auto-tuning the combustor, and may be referred to as an auto-tune controller. Initially, the process includes monitoring the combustion dynamics and emissions of the combustor for a plurality of conditions. Upon determination that one or more of the conditions exceed the predetermined upper limit, a fuel flow split to a fuel circuit is adjusted by the predetermined amount. The control system, or auto-tune controller, continues to monitor the combustion dynamics and to dynamically adjust the fuel flow split by the predetermined amount until the combustion dynamics fall below the predetermined upper limit.

Further, in an alternate embodiment of the process of auto-tuning, the GT engine is monitored and, based on the data recovered from monitoring, automatically adjusted. Generally, the automatic adjustment involves incrementing upward or downward the fuel flow split in order to maintain combustion dynamics and emissions within a preferred operating range, or above/below a limit. In particular, the alternate process initially includes detecting pressure signals in the combustor during the step of monitoring. Subsequent to, or coincident with, the step of monitoring, an algorithm is applied to the detected pressure signals. In one instance, applying the algorithm involves performing a Fourier Transform on the pressure signals to convert the pressure signals into frequency-based data or a spectrum. The amplitude of the frequency-based data is compared to predetermined upper limits (amplitude) for different known conditions. If it is determined that the amplitude of the frequency based data exceeds its respective predetermined upper limit, an incremental adjustment in the fuel flow split is made. In one instance, the incremental adjustment is a change in the fuel flow split carried out in a fixed and pre-determined amount. This incremental adjustment can either increase or decrease the fuel flow split depending on the frequency band being inspected and/or the type of fuel circuit being adjusted. This alternate process recursively repeats until the frequency-based data indicates the GT engine is operating within a suggested range.

In one instance, if the alternate process has been recursively repeated a number of times such that the fuel flow split for a specific fuel circuit has reached a maximum allowable value, a second fuel flow split that affects a second fuel circuit may be adjusted by a predefined fixed amount. If the frequency-based data measured indicate that GT engine is operating within a suggested range, then the alternate process is concluded. Otherwise, the second fuel flow split is recursively adjusted by the same predefined fixed amount until either the amplitude of the frequency-based data moves to acceptable levels or a maximum allowable value of the second fuel flow split is reached. In embodiments, the predefined fixed amount may vary based on which fuel flow split is being monitored, the number of increments of adjustment that have been applied to a particular fuel flow split, or other conditions or parameters that impact the adjustment of the fuel flow split.

In another instance, if the alternate process has been recursively repeated a number of times such that the fuel flow split for a specific fuel circuit has reached a maximum allowable value, the incremental adjustment of the fuel flow split is ceased. Upon cessation of the incremental adjustment, an adjustment of gas temperature may be invoked to bring the operation of the GT engine within a particular performance range. If the adjustment to the gas temperature fails to properly tune the GT engine, an alarm indication is communicated to an operator. This alarm indication may be communicated to a console, a pager, a mobile device, or another technology adapted to receive an electronic message and relay a notification to the operator. The operator will be given the option of incrementing the fuel gas temperature or incrementing the engine firing temperature. If this option is selected, the auto-tune controller will incrementally adjust either of these parameters and repeat this process until the unit is in compliance or a maximum limit is reached. In the event this process is not successful, an alarm indication may alert the operator that automatic tuning has failed to bring the operation of the gas turbine engine within the suggest range, and that manual adjustments to the combustor or the control system are recommended prior to completing tuning.

In addition to adjusting the fuel flow split to the tune the GT engine, AET combined with incremental tuning may be used to find an optimal load for the GT engine. AET allows incremental reduction of the load on the GT engine, while keeping the combustion dynamics and emissions within a preferred operating range through monitoring of criteria and incremental tuning, optimizing the load on the GT engine for a given set of operating conditions and criteria. AET allows an operator of the GT engine to initiate auto-tuning at any time, such as when environmental conditions have changed, or when tuning is otherwise preferable, but when manual tuning is otherwise impossible or impractical. Regular turning permits the GT engine to consistently operate closer to load operating limits (LOL) while keeping selected parameters within desired ranges, allowing more efficient output by the GT engine. It also eliminates the need for manual tuning, allowing operating of the GT engine without scheduled tuning interruptions, and lower maintenance costs. AET can be used in combination with fuel flow split adjustment to determine a new lower operating load, the load at which turbine performance is optimal, and new corresponding turbine reference temperature (TTRF), for a given set of operating conditions.

In one embodiment of AET, a method of decreasing the load combined with incremental tuning to find a new minimum TTRF is provided. The load provided to the GT engine corresponds to an operating TTRF, which is the operating temperature of the GT engine at which the GT engine can run in a pre-mixed fuel mode for an extended period of time. The TTRF is set through load calibration, which is traditionally performed through manual tuning of the load supplied to the GT engine. As discussed above, the manual tuning is performed at regular, spaced intervals, to minimize the disadvantages. To maximize operational flexibility of the GT engine, the lowest operating load, and the corresponding lowest TTRF at which all control parameters are satisfied, should be calibrated and used as consistently as possible during operation of the GT engine. AET with incremental tuning allows an operator to calibrate and tune a new load, and a new corresponding TTRF, as often as desired to match operating conditions to maximize the operational flexibility of the GT engine.

At a high level, AET begins when an input is provided to a GT engine or an associated auto-tune controller to initiate AET. A series of operating criteria (i.e., parameters, including those discussed above related to emissions and dynamics) are checked, and upon those criteria being satisfied, the load on the GT engine is reduced a predefined increment. With each load decrease, the parameters and criteria of the GT engine are monitored to determine if they remain within configured limits, keeping the GT engine "in-tune." When the load is decreased to a point at which one or more monitored turndown criteria are not satisfied (e.g., have exceeded allowable or configured limits), the load is maintained at that level, and an incremental tuning process is initiated. Incremental tuning at this stage may be controlled manually by the operator using tuning knobs to adjust a tuning margin, or automatically by the auto-tune controller. As an example, the tuning may be carried out by adjusting a fuel split. If the tuning restores the monitored criteria to acceptable ranges after one or more tuning attempts (user determined), the incremental load reduction continues, with the load being decreased an additional predefined increment to continue the process.

If tuning does not restore the monitored parameters to acceptable ranges or configured limits, whether at the first time a parameter becomes out of tune, or at a later reduction step, the operator or the auto-tune controller may attempt to tune the load a selected number of times (e.g., three times) to try to adjust the load enough to bring the GT engine back into tune, where each of the monitored criteria are back within configured limits. If the one or more parameters or criteria that are out of tune are not brought within configured limits after the selected number times, or if a tuning margin is exhausted (e.g., the PM1 fuel split margin), the load is increased to the previously determined load where all criteria and parameters have been satisfied. This becomes the new minimum load on the GT engine, and the corresponding TTRF becomes the new minimum load turndown TTRF for a given compressor inlet temperature (CTIM). This minimum load turndown TTRF may be used by the GT engine until it is determined that a new load and corresponding TTRF should be calibrated.

During turndown, several protections against flame-out of the GT engine are often incorporated into the control system for the GT engine. These may include: restricted tuning knob limits, a transient tuning algorithm which can be used during transient load conditions, operator alarms that indicate imminent transfer out of a pre-mixed fuel mode by the GT engine, operator alarms that indicate entry into a new CTIM range, or minimum load buffer levels. In regard to the minimum load buffer levels, a new minimum TTRF may be used to compute different TTRF operating levels. The minimum TTRF provides the lowest TTRF permitted for operation of the GT engine in a pre-mixed fuel mode, below which lean signals go beyond set limits, in which case operating parameters are exceeded and flame-out of the GT engine results unless the fuel mode is changed. This may trigger alarm or safety conditions, and avoiding fuel switching or flame-out during operation is preferred. A higher temperature TTRF is often calibrated and stored, to provide a transfer-out point so the TTRF does not reach the minimum TTRF before transfer-out of the pre-mixed fuel mode occurs. This higher TTRF is referred to as a transfer-out TTRF. A transfer-out TTRF may be calculated by taking the minimum TTRF for a given set of operating conditions and adding a first selected temperature margin to provide a transfer-out TTRF that is higher than the minimum TTRF. The transfer-out TTRF triggers switching of the fuel mode before dropping below the minimum TTRF, avoiding flame-out or other alarm or safety conditions. Incorporating a transfer-out TTRF that is calculated using the minimum TTRF permits greater operating stability of the GT engine.

Additionally, an operating TTRF may be calculated. The operating TTRF corresponds to the minimum load at which the GT engine can run safely and effectively in the pre-mix fuel mode for an extended period of time. The operating TTRF is the TTRF at which the GT engine runs most efficiently for a given set of operating conditions, during its normal operation. It is advantageous to tune the load to provide an operating TTRF that is accurate, because doing so allows the GT engine to operate closer to its LOL. By using incremental load reduction combined incremental tuning by adjusting the fuel flow split, the GT engine load may be tuned and optimized as desired.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein:

FIG. 2 is an exemplary chart depicting recommended fuel flow split adjustments for a fuel-rich condition, in accordance with an embodiment of the present invention;

FIG. 3 is an exemplary chart depicting recommended fuel flow split adjustments for a combustor that is provided with two injection ports, in accordance with an embodiment of the present invention;

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-usable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-usable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-usable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
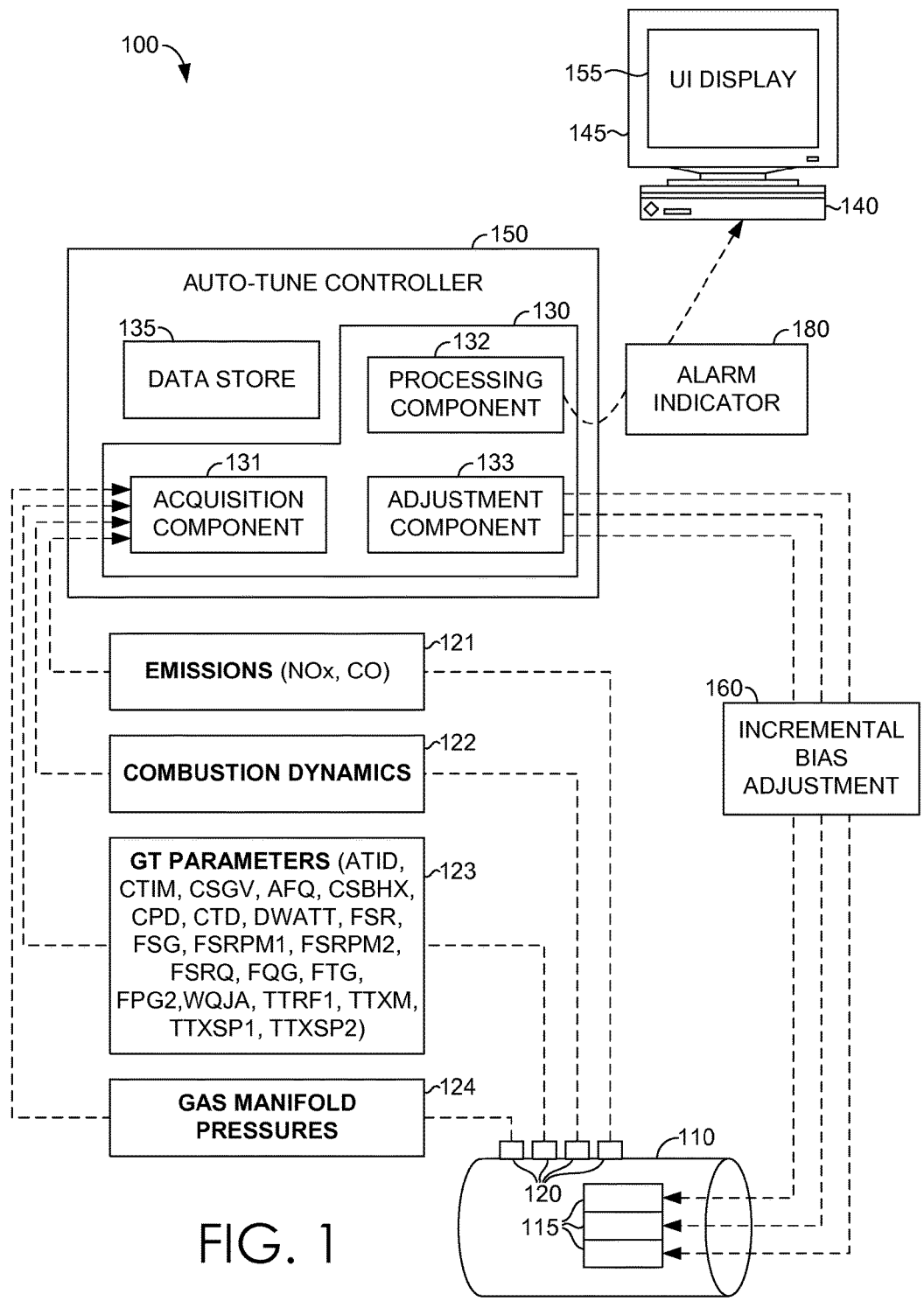
FIG. 1 is a block diagram of an exemplary tuning environment suitable for use in embodiments of the present invention.

As described above, embodiments of the present invention generally relate to automatically tuning a GT engine. With reference to FIG. 1, a GT engine 110 is depicted that accommodates a plurality of combustors 115. Generally, for the purpose of discussion, the GT engine 110 may include any low emission combustors. In one instance, these low emission combustors may be arranged in a can-annular configuration about the GT engine 110. One type of GT engine (e.g., heavy duty GT engines) may be typically provided with, but not limited to, 6 to 18 individual combustors, each of them fitted with a combustor liner, end cover, and casings. Another type of GT engine (e.g., light duty GT engines) may be provided with fewer combustors. Accordingly, based on the type of GT engine, there may be several different fuel circuits utilized for operating the GT engine 110. Further, there may be individual fuel circuits that correspond with each of the plurality of combustors 115 attached to the GT engine 110. As such, it should be appreciated and understood that the auto-tune controller 150, and the tuning process executed thereby (see reference numeral 400 of FIG. 4), can be applied to any number of configurations of GT engines and that the type of GT engines describe hereinbelow should not be construed as limiting on the scope of the present invention.

As discussed above, the plurality of combustors 115 (e.g., low emission combustors) may be prone to elevated levels of pressure fluctuation within the combustor liner. This pressure fluctuation is referred to as "combustion dynamics." Left alone, combustion dynamics can have a dramatic impact on the integrity and life of the plurality of combustors 115, eventually leading to catastrophic failure. These combustion dynamics may be mitigated by adjusting fuel flow splits of the combustor gas flow between several groups of nozzles within the plurality of combustors 115. Generally, a fuel flow split is commonly adjust for each of the plurality of combustors 115, thus the combustors (burners) are tuned alike, as opposed to tuning at the individual burner level. These different "fuel flow splits" are occasionally tuned to ensure that acceptable levels (conventionally low levels) of the combustion dynamics are maintained while, at the same time, promoting acceptable emission levels. The acceptable emission levels relate to the amount of pollutant that is generated by the GT engine 110. Schedules, which govern the fuel flow split for each fuel circuit, are typically hard coded into a control system (not shown) of GT engine 110. In one instance, these schedules are a function of a reference that could be, amongst other things, a turbine inlet reference temperature (TIRF) or a load on the GT engine 110.

Over time, several parameters will affect the combustion dynamics. In particular ambient condition changes and/or gas composition variation and/or normal wear may degrade the operation of the GT engine. This degradation leads to regular "re-tuning" of the combustor to maintain combustion dynamics and emissions within acceptable limits. As discussed herein, an automatic tuning control system, or the auto-tune controller 150 of FIG. 1, is used to assess the state of the GT engine 110 and the plurality of combustors 115 in terms of parameters such as the combustion dynamics, air flow, fuel flows, emissions, and pressure distribution. Based on those parameters, the adequate fuel flow splits are arrived upon by incrementally adjusting the fuel flow splits until the alarm has been cleared, where the alarm is set upon detecting that an amplitude of a pressure pulse surpasses a predetermined upper limit. Accordingly, embodiments of the present invention concern the auto-tune controller 150 and the associated tuning process that enables automatic tuning of the combustion dynamics and emissions using small, consistent incremental changes of the fuel flow split.

An overall tuning process carried out by the auto-tune controller 150 may comprise one or more of the steps described immediately below. Initially, various configurations of pressure signals of the plurality of combustors 115 are monitored and recorded. These recorded pressure signals are passed through a Fourier Transform, where the pressure signals are converted into an amplitude versus frequency data format or spectrum. The amplitude and frequencies are then monitored and the amplitude is compared to a predetermined upper limit for each pre-defined frequency band. The predetermined upper limit is generally defined in terms of pounds per square inch (psi) for a predefined frequency bands. However, in other instances, the predetermined upper limits may be expressed in other terms or units, where other types are devices are used to measure performance of the combustors 115 (e.g., accelerometers). If the determination is made that one or more of the frequency-based amplitude exceeds its respective predetermined upper limit for a predetermined frequency band, then the auto-tune controller 150 firstly determines which fuel flow split to adjust, and secondly alters the fuel flow split associated with the specific frequency band. This adjustment made to the fuel flow split is executed at a predefined amount.

Once the fuel flow split adjustment is made, the process reiterates. That is, the steps of monitoring and comparing the amplitude for a number of predetermined frequency bands to a predetermined upper limit, and adjusting a predetermined fuel flow splits are repeated if the dynamic pressure amplitude is above the predetermined upper limit. Specifically, when the dynamic pressure amplitude is ascertained to exist above the predetermined upper limit, the same predetermined adjustment is made to the fuel flow split. The tuning process repeats as required until the dynamic pressure amplitude falls below the predetermined upper limit or until the fuel flow split cannot be adjusted any further.

If a first fuel flow split cannot be adjusted further, then either a second fuel flow split is adjusted by a second predefined rate and the tuning process repeats, or an alarm indication is issued to an operator. With respect to adjusting the second fuel flow split, the tuning process repeats until the dynamic pressure amplitude falls under the predetermined upper limit or the second fuel split cannot be adjusted any further. If a second fuel flow split cannot be adjusted further, then a third or more fuel flow splits are adjusted.

Although a scheme for iteratively adjusting fuel flow splits in succession has been described immediately above, it should be understood and appreciated by those of ordinary skill in the art that other types of suitable schemes that adjust fuel flow splits may be used, and that embodiments of the present invention are not limited to those schemes that focus on one fuel flow split at a time. For instance, one embodiment of the tuning scheme may iteratively adjust a first fuel flow split by a predefined increment until the dynamic pressure amplitude falls under the predetermined upper limit or until a particular number of iterations is reached, whichever occurs first. If the particular number of iterations is reached, the tuning scheme causes a second fuel flow split to be iteratively adjusted by another predefined increment until the dynamic pressure amplitude falls under the predetermined upper limit or until another particular number of iterations is reached, whichever occurs first. If the other particular number of iterations is reached, the tuning scheme returns to the first fuel flow split. Specifically, the tuning scheme causes the first fuel flow split to again be iteratively adjusted by the predefined increment until the dynamic pressure amplitude falls under the predetermined upper limit or until a third particular number of iterations is reached, whichever occurs first. The tuning scheme may then return to the second fuel flow split or turn to a third fuel flow split for the purposes of adjustment.

In addition to fuel flow split adjustments, a method for carrying out AET on a combustor of a GT engine combined with incremental tuning to maintain emission and dynamics to find a minimum load is provided, in accordance with an aspect of the present invention. AET may be used to calibrate a new minimum TTRF, new transfer-out TTRF, and new operating TTRF. This may be an operator selecting a button or activator denoting "find minimum load." The turndown steps may be repeated recursively, and may continue until a new minimum TTRF, new transfer-out TTRF, and new operating TTRF are calibrated. The method may comprise receiving an input to perform AET on the GT engine. After receiving the input, one or more turndown criteria of the GT engine may be monitored to determine if all of the one or more turndown criteria are met. Upon determining that all of the one or more turndown criteria are met, a transfer-out TTRF may be temporarily reduced if a difference between a current TTRF and the transfer-out TTRF is less than a configured amount. A signal may be sent to reduce a load on the GT engine by a specified amount. This specified amount may be user defined or incrementally based. During and after the load has been reduced, the one or more turndown criteria are monitored to determine if any of the one or more turndown criteria are not met. If all of the turndown criteria are met, the load may again be decreased by the specified amount.

When the load is reduced and it is determined that one or more of the turndown criteria are not met, tuning of the load may be initiated. The tuning may comprise adjusting the fuel flow split, as described above, or other tuning methods. If tuning results in all of the turndown criteria being once again satisfied, AET proceeds, and the load may be reduced an additional step. Upon determining that one or more of the turndown criteria are not met after tuning has begun, repeated tunings may be attempted until a tuning margin is exhausted, or until the tuning has failed a selected number of times. After determining that all of the monitored criteria are not satisfied after tuning the selected number of times, a TTRF associated with a previously determined load at which all of the turndown criteria were satisfied may be stored as the new minimum TTRF for a selected CTIM of the GT engine.

The tuning process may be repeated recursively as many times as necessary, increasing or decreasing the load and monitoring the desired operating criteria to calibrate a load that provides a minimum TTRF that satisfies all of the operating criteria, and that is as close as possible to the tuning margin. During AET, the load may be reduced in configured amounts, the configured amounts being the same, or subject to manual variation, in each of the recursive steps. For example, the load may be reduced by 5 Megawatts at each load reduction step, or a different amount selected by the operator, or an amount programmed into the auto-tune system. The system may be configured to allow the operator to override the process and increase or decrease the size of the load reductions, as desired.

The CTIM at which a minimum TTRF is stored or associated may correspond to one or more CTIM ranges, depending on the operating conditions and environment, and the desired precision of the minimum TTRF versus the actual CTIM. For example, a first CTIM range may correspond to a temperature less than 25 degrees Fahrenheit, a second CTIM range may correspond to a temperature between 25 and 50 degrees Fahrenheit, a third CTIM range may correspond to a temperature between 50 and 75 degrees Fahrenheit, and a fourth CTIM range may correspond to a temperature greater than 75 degrees Fahrenheit. These CTIM ranges correspond to temperatures at the inlet of the GT engine, which varies throughout the year. These ranges demonstrate how with variation in actual CTIM, frequent tuning allows the GT engine to operate closer to the LOL to provide better performance. As a result, using AET on a frequent basis (as compared to manual tuning) can provide enhanced operational flexibility of the GT engine, matching the load and desired criteria to the CTIM more consistently.

The different turndown criteria and parameters monitored during operation of the GT engine may represent conditions that are measured using one or more pressure transducers, emissions-testing devices, accelerometers, and other items that are capable of monitoring the operation of the GT engine, as described above. A non-limiting example of monitored turndown criteria may include Lean-Blowout (LBO), Cold Tone (CT), Hot Tone (HT), Nitrogen-Oxides (NOx), Carbon Monoxide (CO), and position of the fuel split valves (e.g., PM1), or minimums, maximums, or averages of all of the aforementioned turndown criteria. Additional parameters related to emissions and dynamics of the GT engine may be monitored as well. These parameters, or others related to the operation of the GT engine, may be used to indicate whether the tuning is or isn't satisfied, and provide an indication of the appropriate minimum TTRF.

In addition to using AET to calculate a new minimum load turndown TTRF, a new transfer-out TTRF may be calculated from the minimum load turndown TTRF by adding a first selected temperature margin to the minimum load turndown TTRF to provide the new transfer-out TTRF. This can be performed after the AET process is completed, and the temporary modification of the transfer-out TTRF is removed. As explained above, the transfer-out TTRF may correspond to a desired level of operational safety to prevent fuel-switching, flame-out, or triggering of alarm conditions. By way of example, one first selected temperature margin may be 15 degrees, such that the transfer-out TTRF is 15 degrees higher than the minimum load turndown TTRF. The selected temperature margin may be increased or decreased based on the desired level of safety margin for operation of the GT engine.

In addition to calculating a new minimum load turndown TTRF and transfer-out TTRF, a new turndown operating TTRF may also be calculated from the minimum load turndown TTRF. The turndown operating TTRF is the TTRF at which the GT engine may run for an extended period of time in the pre-mixed fuel mode. The turndown operating TTRF may be calculated by adding a second selected temperature margin to the minimum load turndown TTRF to provide a new turndown operating TTRF. The second selected temperature margin is greater than the first selected temperature margin. For example, the second selected temperature margin may be 30 degrees, such that the turndown operating TTRF is 30 degrees higher than the new minimum load turndown TTRF and 15 degrees higher than the new transfer-out TTRF. The processor may be configured to transmit the new minimum load turndown TTRF, the new transfer-out TTRF, the new operating TTRF, and the first and second margin information to a controller or to the GT engine to provide new set points for the GT engine's corresponding TTRF.

When it is determined that after a load reduction, one or more turndown criteria are not satisfied, the processor may check the restriction of tuning knobs used to tune the power load to a user configured setting. The movement of the tuning knob, or the available tuning margin, may be restricted to prevent errors or alarms caused by overtuning, or exceeding allowable limits of a tuning parameter (e.g., PM1 fuel split). The processor or operator may be required to check the restriction of the tuning knobs prior to tuning during AET to ensure that there is adequate range available for tuning. In a similar regard, the knobs may be restricted so that less than the maximum tuning margin is used when adjusting the load, preventing movement of the actual TTRF too close to the minimum TTRF, which may cause flame-out, as discussed above. When not performing AET, the tuning knobs may be unrestricted to allow the entire margin to be used for other tuning processes.

Once the minimum load turndown TTRF has been calibrated, a transfer-out TTRF deadband and operating TTRF deadband of the GT engine is updated. The restriction on any applicable tuning knobs, such as a knob controlling a fuel split, used during tuning, is removed, and the new minimum load turn-down TTRF may be displayed on a screen or sent to another display component to provide a notification to the operator. Various indication and operator alarms may be configured to indicate to the operator that a minimum TTRF should be recalibrated. Additionally, operator alarms may be configured to alert an operator if the GT engine reaches a TTRF that is lower than a selected transfer-out TTRF. Additionally, when not performing AET, if a GT engine is exposed to a new CTIM, an alarm or indication may be provided to the operator or to the tuning system, providing an indication to find a new load to recalibrate the minimum TTRF using AET.

In addition to providing a method for AET, a system for AET is also provided, in accordance with an embodiment of the present invention. The system may comprise a GT engine including one or more combustors that are each provided with a first minimum TTRF, a first transfer-out TTRF, and an operating TTRF. A load controller and an auto-tune controller for carrying out AET and incremental tuning may also be provided. A user or user input device for sending user input to the auto-tune controller may be provided, as well as a user output or display device for providing information and feedback from the auto-tune controller to the operator. The auto-tuning controller may be configured to provide commands to the load controller to increase or decrease the load supplied to the GT engine. The auto-tune controller, or another turbine operating controller, may be configured to send signals to the GT engine or load controller to set the first minimum TTRF, a first transfer-out TTRF, and the operating TTRF for the GT engine. A number of components for measuring tuning criteria may also be provided, the measuring components configured to send data, signals, and/or measurements to the other components, such as the auto-tune controller or the user output or display, as needed to perform AET or the tuning process and provide adequate feedback to an operator.

The auto-tune controller, or the user input device, may include an input receiving component, such as a button or switch, for receiving an indication to perform AET. The system may further comprise a device that is configured to alert the operator to perform AET at set times, such as when a new CTIM range is entered. The auto-tune controller may also include one or more tuning knobs to allow a user to manually or selectively adjust the load during the tuning process, or set a desired step reduction for the load reductions performed during the AET process.

In one embodiment, the AET tuning process may be configured to detect if a higher minimum TTRF is required, and upon determining that a higher minimum TTRF is required, determining a new higher minimum TTRF by incrementally increasing the load on the GT engine. In such an embodiment, the process of AET may begin when an operator presses a button to find a new minimum load. Once load adjustment has begun, an auto-tune controller may check to see if the system is working properly by checking the turndown criteria. The turndown criteria may include: determining if an alarm limit has been reached, checking if the tuning limits have been reached, checking if other limits have been reached (such as minimum average TTRF, CO limit, minimum fuel split valve limits, etc.) that would prevent AET from occurring, and if no alarms are triggered for the aforementioned criteria, proceeding with tuning or load adjustment. If an error occurs, the system may be configured to exit the tuning loop, or if an auto-tuning error occurs that indicates the minimum TTRF is too low, the system may initiate incremental load adjustment on the GT engine to increase the load by one step, or rather by one selected power adjustment, and monitor whether the tuning criteria are satisfied. Upon reaching a load at which the tuning criteria are once again satisfied, the TTRF may be saved as the new increased minimum TTRF. A new corresponding transfer-out TTRF and operating TTRF may then be calculated, as discussed above. Thus, the tuning algorithm may allow increasing of the load to determine a new, higher minimum TTRF. If AET is required, AET may begin to decrease the load to find a new minimum TTRF that is lower than the current TTRF, as described above. In this regard, the load applied to the GT engine may be adjusted upward or downward to find an operating load and corresponding TTRF that keeps the GT engine operating within allowable parameters. Additionally, the operational flexibility and output of the GT engine can be optimized, allowing the GT engine to perform closer to the LOL.

Figure 4:
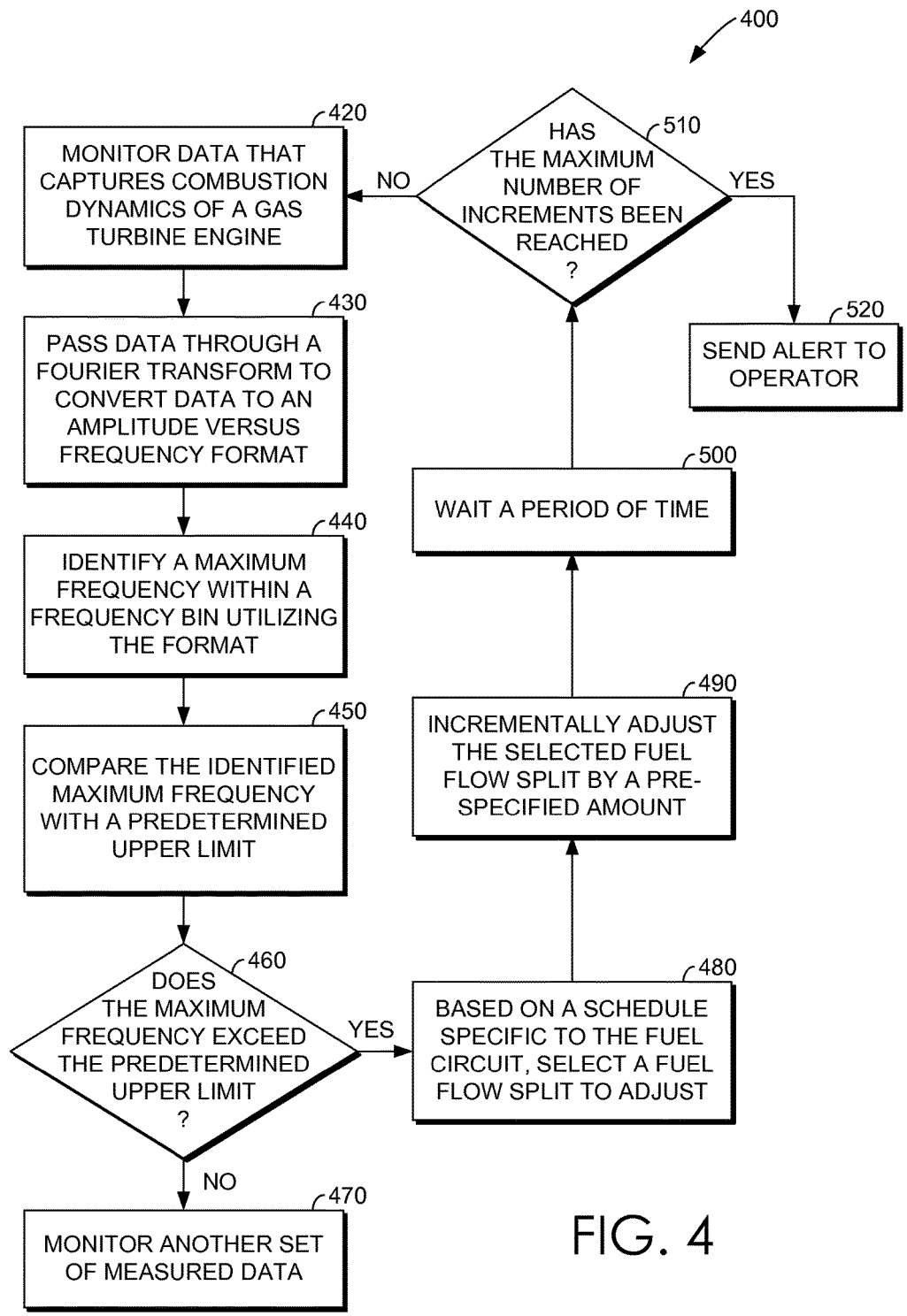
FIG. 4 is a flow diagram of an overall method for employing an auto-tune controller to implement a tuning process that includes collecting measurements from a combustor and altering the fuel flow splits based on the measurements, in accordance with an embodiment of the present invention.

With reference to FIGS. 1 and 4, an exemplary embodiment of the tuning process will now be described in detail. Initially, FIG. 1 illustrates an exemplary tuning environment 100 suitable for use in embodiments of the present invention. The exemplary tuning environment 100 includes the auto-tune controller 150, a computing device 140, and the GT engine 110. The auto-tune controller 100 includes a data store 135 and a processing unit 130 that supports the execution of the acquisition component 131, the processing component 132, and the adjustment component 133. Generally, the processing unit 130 is embodied as some form of a computing unit (e.g., central processing unit, microprocessor, etc.) to support operations of the component(s) 131, 132, and 133 running thereon. As utilized herein, the phrase "processing unit" generally refers to a dedicated computing device with processing power and storage memory, which supports operating software that underlies the execution of software, applications, and computer programs thereon. In one instance, the processing unit 130 is configured with tangible hardware elements, or machines, that are integral, or operably coupled, to a computer. In another instance, the processing unit may encompass a processor (not shown) coupled to the computer-readable medium (discussed above). Generally, the computer-readable medium stores, at least temporarily, a plurality of computer software components that are executable by a processor. As utilized herein, the term "processor" is not meant to be limiting and may encompass any elements of the processing unit that act in a computational capacity. In such capacity, the processor may be configured as a tangible article that processes instructions. In an exemplary embodiment, processing may involve fetching, decoding/interpreting, executing, and writing back instructions (e.g., reconstructing the physical gestures by presenting animations of the motion patterns).

In addition, the auto-tune controller 100 is provided with the data store 135. Generally, the data store 135 is configured to store information associated with the tuning process or data generated upon monitoring the GT engine 100. In various embodiments, such information may include, without limitation, measurement data (e.g., measurements 121, 122, 123, and 124) provided by sensors 120 coupled to the GT engine 110. In addition, the data store 135 may be configured to be searchable for suitable access of stored information. For instance, the data store 135 may be searchable for schedules in order to determine which fuel flow split to increment upon comparing measured dynamic pressure amplitude to a corresponding predetermined upper limit. It will be understood and appreciated that the information stored in the data store 135 may be configurable and may include any information relevant to the tuning process. The content and volume of such information are not intended to limit the scope of embodiments of the present invention in any way.

In embodiments, the auto-tune controller 100 will record look-up tables (e.g., utilizing the data store 135 of FIG. 1). These look-up tables may include various information related to the operational conditions of the GT engine and combustors attached thereto. By way of example, the look-up tables may include an operating curve with a suggested tolerance band that defines the outer limits of efficient operation. Upon performing the process of automatically tuning the GT engine, the auto-tune controller may be automatically reprogrammed to record aspects of the tuning process in the operating curve. That is, the operating curve in the look-up table is altered to reflect occurrences during, and results from, the tuning process. Advantageously, the altered operating curve may be access during the next tuning procedure, thus, making each subsequent tuning more efficient (e.g., reduce the number of fuel flow adjustment increments needed to bring a condition below the predetermine upper limit). In this way the look-up table (e.g., operational matrix) can be automatically developed through the incremental adjustment of one parameter at a time. Since the incremental adjustment is stored in the operational curve, the auto-tune controller learns the optimum tuning performance for any particular operating system. This greatly reduces the amount of tuning required which will be beneficial for units on auto grid control (AGC) where stable points may be infrequent or for units experiencing sudden cyclic variations in fuel properties or ambient conditions.

In some embodiments, should the tuning by way of adjusting the fuel flow split not alleviate an emissions or dynamics alarm, an incremental bias can be supplied to adjust fuel temperature from the optimum out-of-compliance split tuning point identified per the section above. However, if incrementally biasing the fuel temperature is not an option—due to absent or limited fuel temperature manipulation ability—and the unit remains in alarm mode, a request may be issued to allow adjustment of the firing curve of the GT device. If the operator request is granted, an incremental firing temperature bias is provided to the existing unit firing curve at the optimum out-of-compliance point described in the above section.

With continued reference to the look-up table stored on the auto-tune controller 100, variations of the look-up table configuration will now be described. In one instance, a number of look-up tables are provided that graph splits versus TIRF, or load. Each of these look-up tables relate to a combination of a number of ambient temperatures and gas parameters. The "gas parameter" is characteristic of the gas composition and properties, and may be implemented as a relative value as compared to a nominal initial value. The tuning adjustment is performed at a stable TIRF, or load. Whenever an incremental bias adjustment is needed because an alarm level or emission level was exceeded, the algorithm first determines which ambient temperature and gas parameter family the unit is operating in, and then which fuel split to change and in which direction. Secondly, the desired bias increment (upwards or downwards) and the current TIRF, or load, is recorded. The algorithm then determines which table shall be modified depending on the recorded ambient temperature and gas parameter. Once defined, the algorithm determines which points in the split versus TIRF graph are bracketing the current value for TIRF. Upon identifying those two points, the bias value for the two points is incrementally modified (upwards or downwards), and the increment is stored in the correct look-up table.

Further, the exemplary tuning environment 100 includes the computing device 140, which is operably coupled to a presentation device 145 for displaying a user interface (UI) display 155 that warns an operator of a failure to automatically tune the GT engine 100. The computing device 140, shown in FIG. 1, may take the form of various types of computing devices. By way of example only and not limitation, the computing device 145 may be a personal computer, desktop computer, laptop computer, handheld device, consumer electronic device (e.g., pager), handheld device (e.g., personal digital assistant), various servers, and the like. It should be noted, however, that the invention is not limited to implementation on such computing devices, but may be implemented on any of a variety of different types of computing devices within the scope of embodiments of the present invention.

With reference to FIG. 4, a tuning process 200 will now be discussed in light of the exemplary tuning environment 100 of FIG. 1. Generally, FIG. 4 is a flow diagram of an overall method 400 for employing the auto-tune controller 150 of FIG. 1 to implement a tuning process that includes collecting measurements from the plurality of combustors 115 and altering the fuel flow splits based on the measurements, in accordance with an embodiment of the present invention. Initially, the overall method 400 includes monitoring data that represents combustion dynamics of the GT engine 100. In one embodiment, the combustion dynamics 122 are measured for each of the plurality of combustors 115 using the sensors 120 (e.g., pressure transducers) that communicate the measurement data to the acquisition component 131. In another embodiment, the sensors 120 communicate emissions 121 that are detected from the GT engine 100. In yet other embodiments, the measurement data collected from the GT engine 110 may include, but is not limited to, GT parameters 123 and gas manifold pressures 124.

In some instances, the data collected from the GT engine 100 is normalized. For instance, the sensors 120 may be configured as pressure transducers that detect pressure fluctuations in each of the plurality of combustors 115 and report those fluctuations as the combustion dynamics 122. The fluctuations may be measured over a time period and sent to the acquisition component 131 in the form of a rolling average of pressure variability.

Step 430 of the overall method 430 pertains to passing the measured data through a Fourier Transform, or another appropriate algorithm, in order to convert the data to an amplitude versus frequency format (utilizing the processing component 132 of FIG. 1). This amplitude versus frequency format may take on a variety of configurations, such as a graph, a chart, or a matrix, and is referred to hereinbelow as a "spectrum." In one instance, when the amplitude versus frequency format takes on the configuration of a matrix, the matrix may include the following categories of values: combustor identity, frequency, and amplitude.

In embodiments, the spectrum may be divided by frequency range, or discretized, into a number of frequency bands, where each band has its own predetermined upper limit in terms of amplitude. The spectrum may be discretized into any number of frequency bands. In one instance, the spectrum is discretized into 4-6 frequency bands, or windows, based on the type of GT engine 100 being tuned, where each frequency band expresses a different parameter. In operation, when the predetermined upper limit (i.e., alarm level limit) for a particular frequency band is exceeded, the schedule instructions the auto-tune controller 150 which fuel flow split to change and in which direction (upwards or downwards) to make an adjustment. Typically, the proper fuel flow split to change and the proper manner of adjustment are selected based on the type of measured data being processed (e.g., combustor dynamics or emission levels) and the nature of the measured data being processed (e.g. combustor dynamics tone, type of emission such as NOx or CO).

In step 440, a maximum dynamic pressure amplitude is identified within each of the frequency bands. This maximum dynamic pressure amplitude may be determined by selecting the maximum dynamic pressure amplitude for each class of measured data (combustion dynamics 122) within one or more of the frequency bands. Both the predetermined upper limit (i.e., alarm limit level) and the maximum dynamic pressure amplitude derived from each frequency band are measured in terms of pounds per square inch (psi).

As depicted in step 450, the identified maximum dynamic pressure amplitude is compared against an appropriate predetermined upper limit. (There is no specific priority order to comparing or addressing outlier maximum frequencies.) This predetermined upper limit may be based on a type of measured data being evaluated and/or the fuel circuit being tuned. Upon comparison, a determination of whether the maximum dynamic pressure amplitude exceeds the predetermined upper limit is performed, as depicted at step 460. If the maximum dynamic pressure amplitude does not exceed the predetermined upper limit, such that the GT engine 100 is operating within a suggested range with respect to the particular measured data, the tuning process moves to another condition. That is, the tuning process proceeds to monitor and evaluate another set of measured data, as depicted at step 470. By way of clarification, just the dynamic pressure amplitude is monitored in a series of frequency bins. Other parameters are not a function of frequency bins, but still are subject to maximum tuning limits.

If, however, the maximum dynamic pressure amplitude does exceed the predetermined upper limit, a fuel flow split is selected for adjustment. This is indicated at step 480 of FIG. 4. As discussed above, the appropriate fuel flow split is selected by a schedule, as discussed more fully below with reference to FIGS. 2 and 3. This selected fuel flow split is then incrementally adjusted by a pre-specified amount, as depicted at step 490. Incrementally adjusting the fuel flow split may be accomplished by the adjustment component 133 of FIG. 1 transmitting an incremental bias adjustment 160 to at least one of the plurality of combustors 115 mounted to the GT engine 100. In one embodiment, automatic valves on the combustors 115 adjust the fuel flow split for a subject fuel circuit in response to recognizing the incoming incremental bias adjustment 160.

This predefined amount is typically based on testing experience and the combustor identity (as provided by the matrix). In one instance, the predefined amount of incremental adjustment is 0.25% adjustment of the fuel flow split between the injection ports. Accordingly, by incrementing a fuel flow split upwards or downwards by the pre-specified amount, the pattern of fuel flow distribution through injection points is altered. However, even though the fuel flow split is changed, the total fuel flow to the fuel circuit is generally held constant.

Upon applying the incremental bias adjustment 160, the auto-tune controller 150 waits a period of time before acquiring and processing data extracted from the GT engine 100. This is depicted at step 500 of FIG. 4. Waiting the period of time ensures that the GT engine 100 stabilizes before checking to determine whether adjusting the fuel flow split was sufficient to tune the GT engine 100. In embodiments, the period of time that is waited between adjustments may vary based on the type of parameter, or measured data, being processed. For instance, the period of time required to stabilize a combustion dynamic may be less that the period of time required to stabilize emissions.

At step 510, a determination is performed to ascertain whether a maximum number of increments has been reached. If the maximum number of increments that the fuel flow split can be adjusted is not reached, the process is allowed to reiterate. Accordingly, the fuel flow split can be adjusted at least one more time if the comparison step 450 indicates that further incremental adjustment is needed. However, if the maximum number of increments that the fuel flow split can be adjusted is not reached, then either another fuel flow split can be adjusted (as determined by the schedule), or an alert is sent to an operator. This is depicted at step 520. In one embodiment, an alarm indicator 180 is sent to the computing device 140 by the processing component 132. In response to the alert, the operator may take action to manually tune the GT engine 100 or contact a technician to service the GT engine 100.

In some embodiments, sending an alert to the operator is the first action that is taken, as instructed by the schedule. That is, if the measured data for a particular parameter, upon processing the data through the Fourier Transform, exceeds a corresponding predetermined upper limit, then the first action taken is notifying the operator of the discrepancy, as opposed to incrementally adjusting a fuel flow split.

Another embodiment allows the operator to allow the auto-tune controller 150 to incrementally adjust the fuel gas temperature and/or the firing temperature to achieve in compliance operation.

Turning now to FIG. 2, an exemplary chart 200, or schedule, depicting recommended fuel flow split adjustments for a fuel-rich condition are provided, in accordance with an embodiment of the present invention. As illustrated, the chart 200 includes an indication 210 of the type of fuel being consumed by the GT engine being tuned. Further, the chart includes a row 220 that lists the conditions being monitored. In this exemplary chart 200, there are four conditions being monitor, which are parameters A-D. Although four conditions are monitored in this instance, the number of monitored conditions should not be construed as limiting, as any number of conditions may be observed for auto-tuning the GT engine. Generally, parameters A-D may represent particular conditions that are measured using pressure transducers, emissions-testing devices, accelerometers, and other items that are capable of monitoring the operation of the GT engine. By way of example, parameter A may represent Lean-Blowout (LBO), parameter B 221 may represent Cold Tone (CT), parameter C may represent Hot Tone (HT), and parameter D may represent Nitrogen-Oxides (NOx). Accordingly, in this example, parameters A-C relate to pressure data, while parameter D relates to a gas composition. Typically, the gas composition is determined by monitoring the concentrations levels of emissions (e.g., CO and NOx). A tuning process with incremental adjustments, similar to the one described above, may be used in connection with conditions that involve emissions.

Each of parameters A-D is automatically monitored during the tuning process. Further, the data monitored during the tuning process is processed via the Fourier Transform to determine a maximum amplitude for each condition. If any of the maximum amplitudes for these conditions exceeds or falls below an individual, predetermined limit mapped to each of the parameters A-D, respectively, the actions 230 are carried out.

By way of example, if the maximum amplitude for parameter B 221 (e.g., the CT condition) exceeds an individual, predetermined upper limit mapped to parameter B 221, the actions 231, 232, and 233 are carried out based on the ordering 250. Specifically, if the maximum dynamic pressure amplitude for the parameter B 221 exceeds the predetermined upper limit, the SPLIT 2 232 is initially increased by the incremental amount, as indicated by the ordering 250. Then, upon recursively increasing the SPLIT 2 232 by an incremental amount until the maximum number of adjustments for that fuel flow split is reached, the SPLIT 1 231 is decreased. Next, if adjusting the SPLIT 1 231 is ineffective, the SPLIT 3 233 is exercised. Last, if adjusting the SPLIT 3 233 is ineffective to reduce the maximum frequency amplitude below the predetermined upper limit, an alarm is sent to an operator. As will be recognized in the relevant field, the exemplary method above is just an example of a process for auto-tuning a particular engine, such as the 7FA Engine, and there will be different methods, which include different monitored parameters and varied fuel flow splits, for auto-tuning other engines.

Although a single configuration of a schedule (e.g., chart 200) for selecting which actions to take in light of the predetermined upper limits being exceeded has been described, it should be understood and appreciated by those of ordinary skill in the art that other types of suitable schedule that provide an organized hierarchy of actions may be used, and that embodiments of the present invention are not limited to the conditions and actions of the schedule described herein. In addition, it should be noted that the auto-tune controller can be used with a variety of combustion systems. Therefore, the present invention is not limited to just three fuel split adjustments. The exact quantity of fuel nozzles and fuel flow splits can vary depending on the combustor configuration and type of GT engine being tuned. So, for a different combustion system, the number of adjustment points could be greater or fewer than those depicted in the present disclosure without departing from the essence of the present invention.

Further, the chart 200 depicts adjustments to fuel flow splits in response to multiple frequency bands for various monitored conditions. In the event that multiple frequencies exceed their respective predetermined upper limits, no preference or priority is made by the auto-tune controller for determining which frequency to address first. However, in other instances, some preferential guidelines are utilized by the auto-tune controller 150 of FIG. 1 to make decisions as to which order the frequencies are addressed.

With reference to FIG. 3, an exemplary chart 300 depicting recommended fuel flow split adjustments 320 for a combustor that is provided with two injection ports is shown, in accordance with an embodiment of the present invention. Because, only two injection ports are provided, there is only one fuel flow split that can be adjusted to distribute fuel between the injection ports provided. Further, two conditions 310 of the GT engine being tuned are measured in this instance. These conditions 310 are represented by Parameter A and Parameter B. If either Parameter A or B exceeds a corresponding, predetermined upper limit, the schedule indicates which of the fuel flow split adjustments 320 to take. If adjusting the prescribed fuel flow split a maximum recommended number of times does not bring the GT engine into a normal operational range, then the next step involves sending an alarm to an operator or automatically placing a call to a technician.

Figure 5:
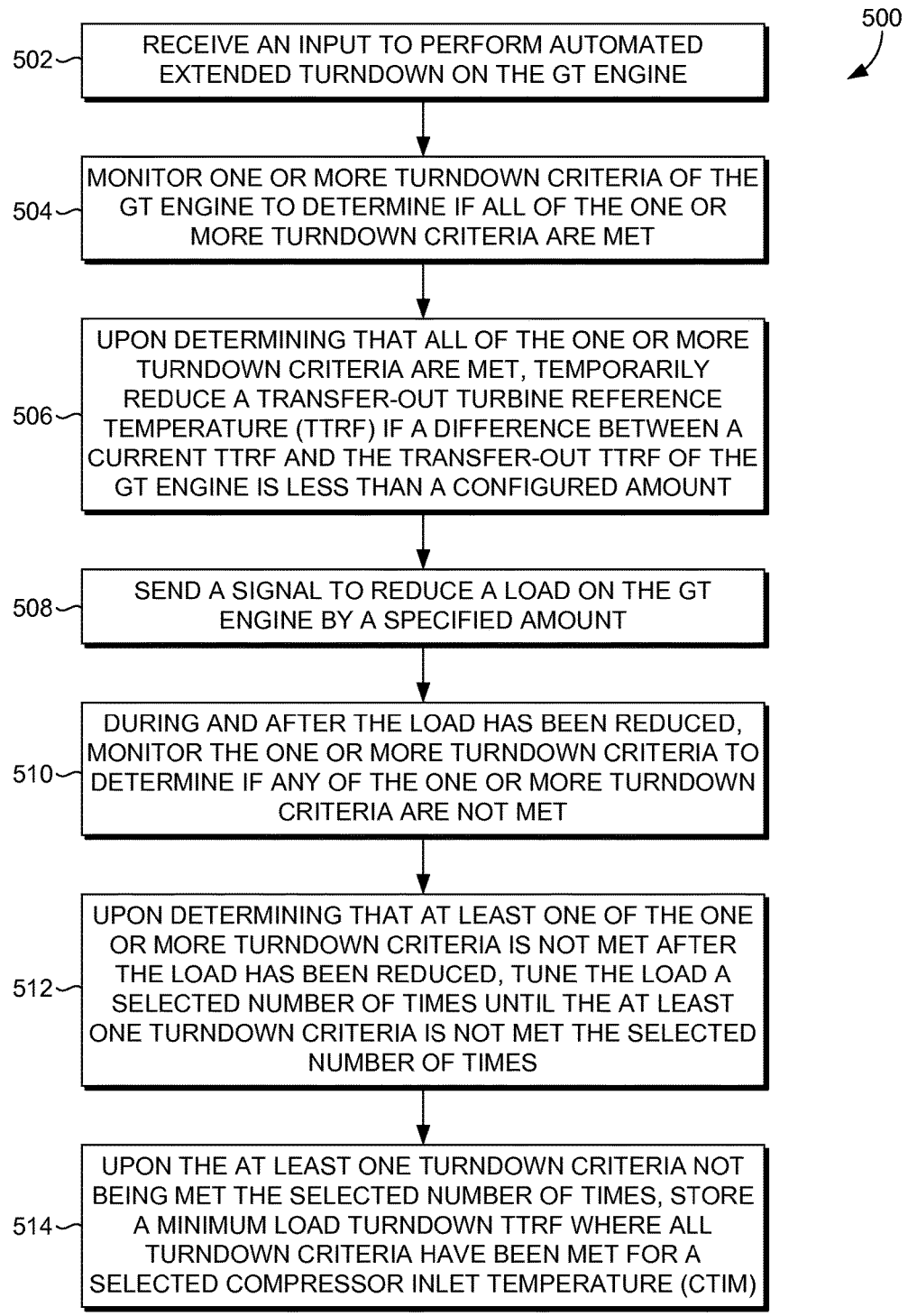
FIG. 5 is a flow diagram of a first overall method of performing automatic extended turndown with incremental tuning to maintain emission and dynamics, in accordance with an aspect of the present invention.

Turning now to FIG. 5, an exemplary method 500 of automated extended turndown combined with incremental tuning to maintain emission and dynamics of a GT engine is provided, in accordance with an embodiment of the present invention. At a first step 502, an input to perform AET on the GT engine is received. This input may be received from an operator who pushes a button "find minimum load." In this regard, the turndown algorithm is not automatically activated as the GT engine runs on AGC. At a second step 504, one or more turndown criteria, such as the turndown criteria described herein, of the GT engine are monitored to determine if all of the one or more turndown criteria are met. In this regard, the operating criteria of the GT engine may be monitored to determine if an issue exists that would negatively affect, stop, or require cancellation of the AET process, such as one of the turndown criteria being exceeded. If the minimum TTRF is determined to be too low, such as when one of the turndown criteria is inherently unsatisfied before beginning AET, a process may be initiated to raise the minimum TTRF. Otherwise, at a third step 506, upon determining that all of the one or more turndown criteria are met, a transfer-out TTRF is temporarily modified (e.g., this can occur if a difference between a current TTRF and the transfer-out TTRF is less than a configured amount). At a fourth step 508, a signal is sent to reduce a load on the GT engine by a specified amount (e.g., 5 megawatts). At a fifth step 510, during and after the load has been reduced, the one or more turndown criteria are monitored to determine if any of the one or more turndown criteria are not met. If all of the turndown criteria are met, the load may again be reduced the specified amount or another amount, continuing AET. At a sixth step 512, upon determining that at least one of the one or more turndown criteria is not met after the load has been reduced, tuning the load a selected number of times until the at least one turndown criteria is not met the selected number of times. At a seventh step 514, upon the at least one turndown criteria not being met the selected number of times, storing a minimum load turndown TTRF where all of the turndown criteria have been met for a selected CTIM. The minimum load turndown TTRF that is stored may be the load level immediately previous to the load level at which tuning failed the selected number of times, or another load level. A transfer-out TTRF and operating TTRF may subsequently be calculated from the minimum load turndown TTRF, as described herein.

Figure 6:
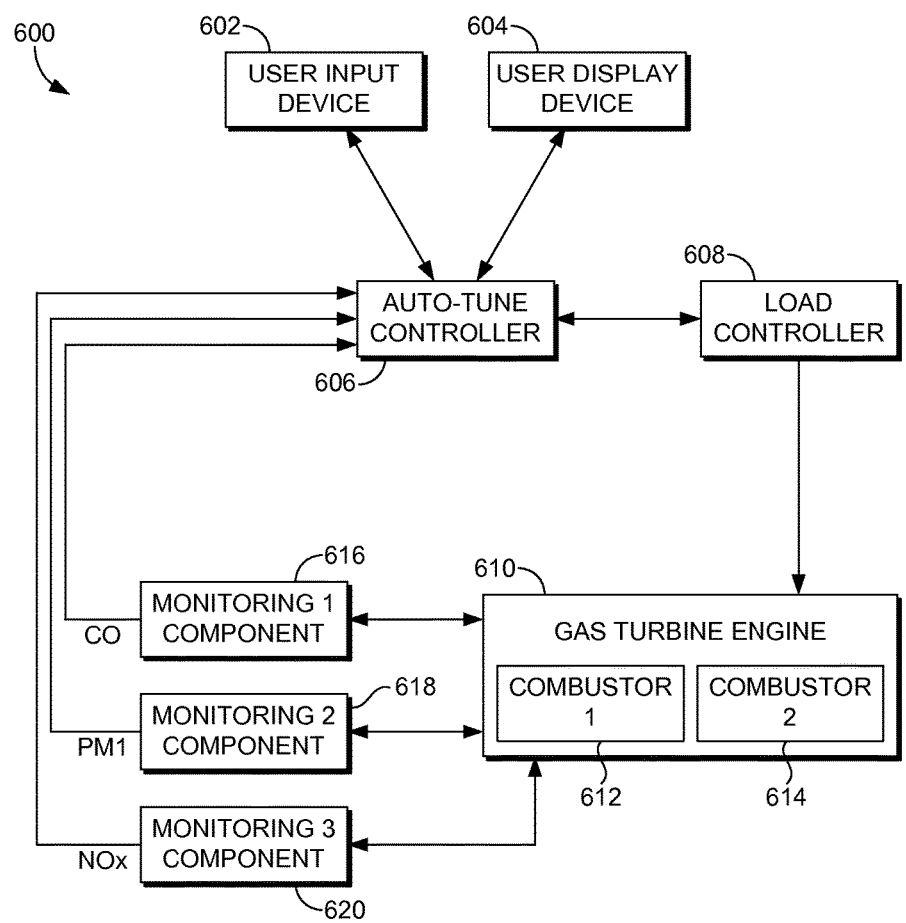
FIG. 6 is a block diagram of an exemplary tuning environment for performing automatic extended turndown with incremental tuning to maintain emission and dynamics of a gas turbine engine, in accordance with an aspect of the present invention.

Referring to FIG. 6, a system 600 of automated extended turndown combined with incremental tuning to maintain emission and dynamics of a GT engine is provided, in accordance with an embodiment of the present invention. The system 600 includes a user input device 602, which may be configured to receive commands or instruction from an operator (e.g., via buttons or tuning knobs), a user display device 604, which may be configured to receive and display information from an auto-tune controller 606 or other components, and which may be a Human Machine Interface ("HMI") screen, and the auto-tune controller 606 which may be configured to control incremental load reductions on the GT engine, control the tuning process, and receive information related to one or more monitored criteria, among other things. The system further comprises a load controller 608, which may be configured to receive indications from the auto-tune controller 606 to increase or decrease a load on a GT engine 610. The GT engine 610 has a first combustor 612 and a second combustor 614.

Additionally, the system 600 includes several monitoring components 616, 618, 620, which are configured to receive information related to emissions or dynamics of the GT engine 610. In this exemplary system 600, the first monitoring component 616 provides information related to CO from the GT engine 610, the second monitoring component 618 provides information related to a fuel split of the GT engine (which may relate to the tuning of the GT engine), and the third monitoring component 620 provides information related to NOx, an emission output of the GT engine. Multiple configurations of the system 600 are possible, where the monitoring components 616, 618, 620 send information directly to the user output device 604 or a turbine control or processing unit (not shown). Additionally, any number of various operating criteria can be monitored by additional or different monitoring components, the monitoring components configured to provide feedback to an operator via the auto-tune controller 606 and/or user display device 604. The components of the system 600 may be connected in different ways to send information or commands to, from, or through any of the identified components.

Figure 7:
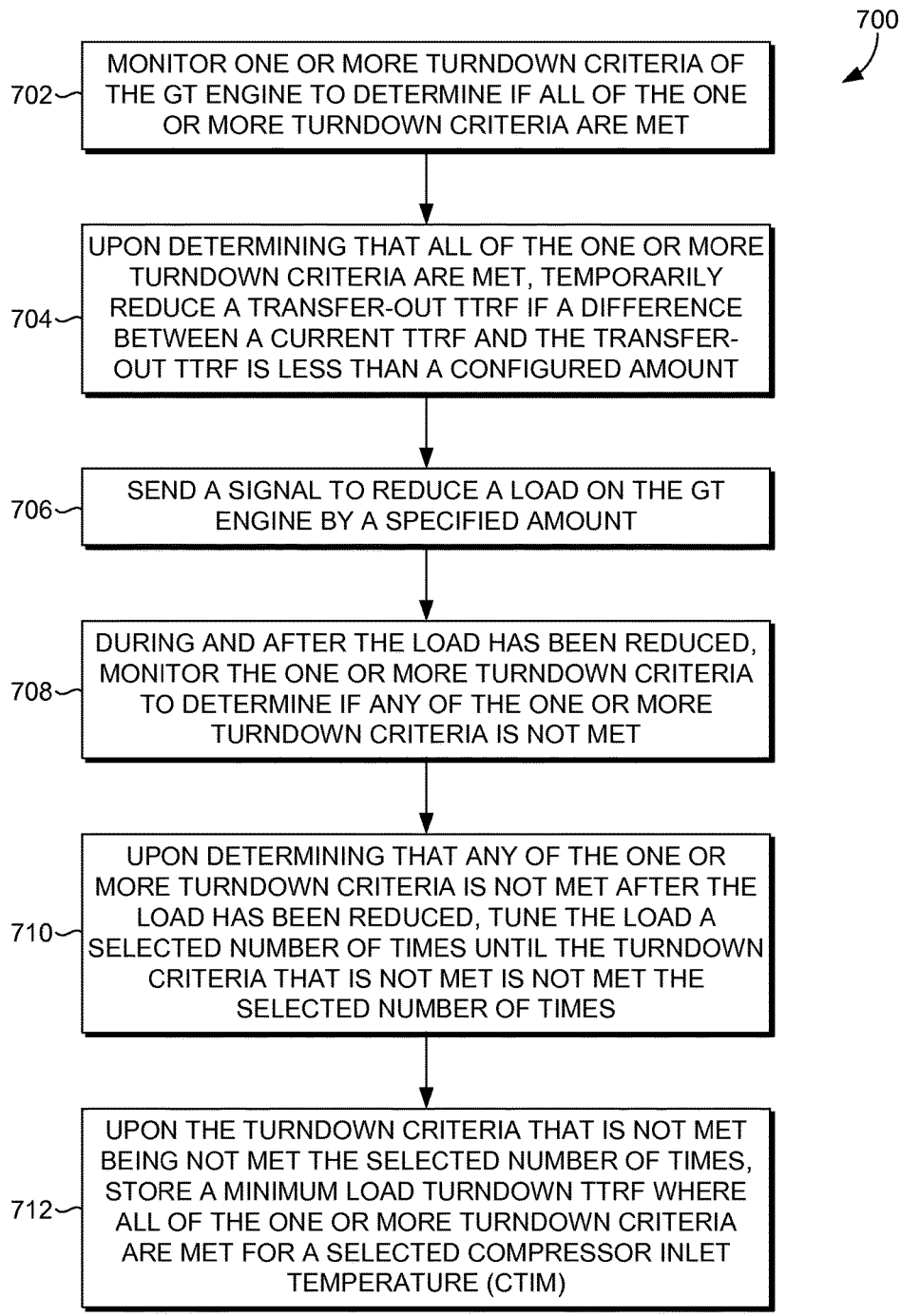
FIG. 7 is a flow diagram for a second overall method of performing automatic extended turndown with incremental tuning to maintain emission and dynamics of a GT engine, in accordance with an aspect of the present invention.

Referring to FIG. 7, an exemplary method 700 of automated extended turndown combined with incremental tuning to maintain emission and dynamics of a GT engine is provided, in accordance with an embodiment of the present invention. At a step 702, one or more turndown criteria, such as the turndown criteria described herein, of the GT engine are monitored to determine if all of the one or more turndown criteria are met. The turndown criteria may be related to emissions and dynamics of the GT engine, as discussed above, and may also include a fuel flow split for measuring available tuning capacity. At a step 704, upon determining that the one or more turndown criteria are met, a transfer-out TTRF is temporarily reduced if a difference between a current TTRF and the transfer-out TTRF is less than a configured amount, in order to avoid the GT engine transferring out of the pre-mixed fuel mode when the load is reduced to calculate a new minimum TTRF. At a step 706, a signal is sent to reduce a load on the GT engine by a specified amount. At a step 708, during and after the load has been reduced, the one or more turndown criteria are monitored to determine if any of the one or more turndown criteria are not met. At a step 710, upon determining that any of the one or more turndown criteria is not met after the load has been reduced, the load is tuned a selected number of times until the turndown criteria that is not met is not met the selected number of times. The selected number of times for tuning may be chosen based on a desired level of certainty in the tuning process (e.g., one time for minimum certainty, three times for enhanced certainty). Additionally, if the tuning process restores the one or more criteria that is not met to a satisfied condition such that all of the monitored criteria are satisfied, the AET process may continue, reducing the load another step. At a step 712, upon determining that the turndown criteria that is not met is not met the selected number of times, the new minimum load turndown TTRF is stored, the minimum load turndown TTRF being the TTRF at which all of the one or more turndown criteria have been met for a selected CTIM.

Figure 8:
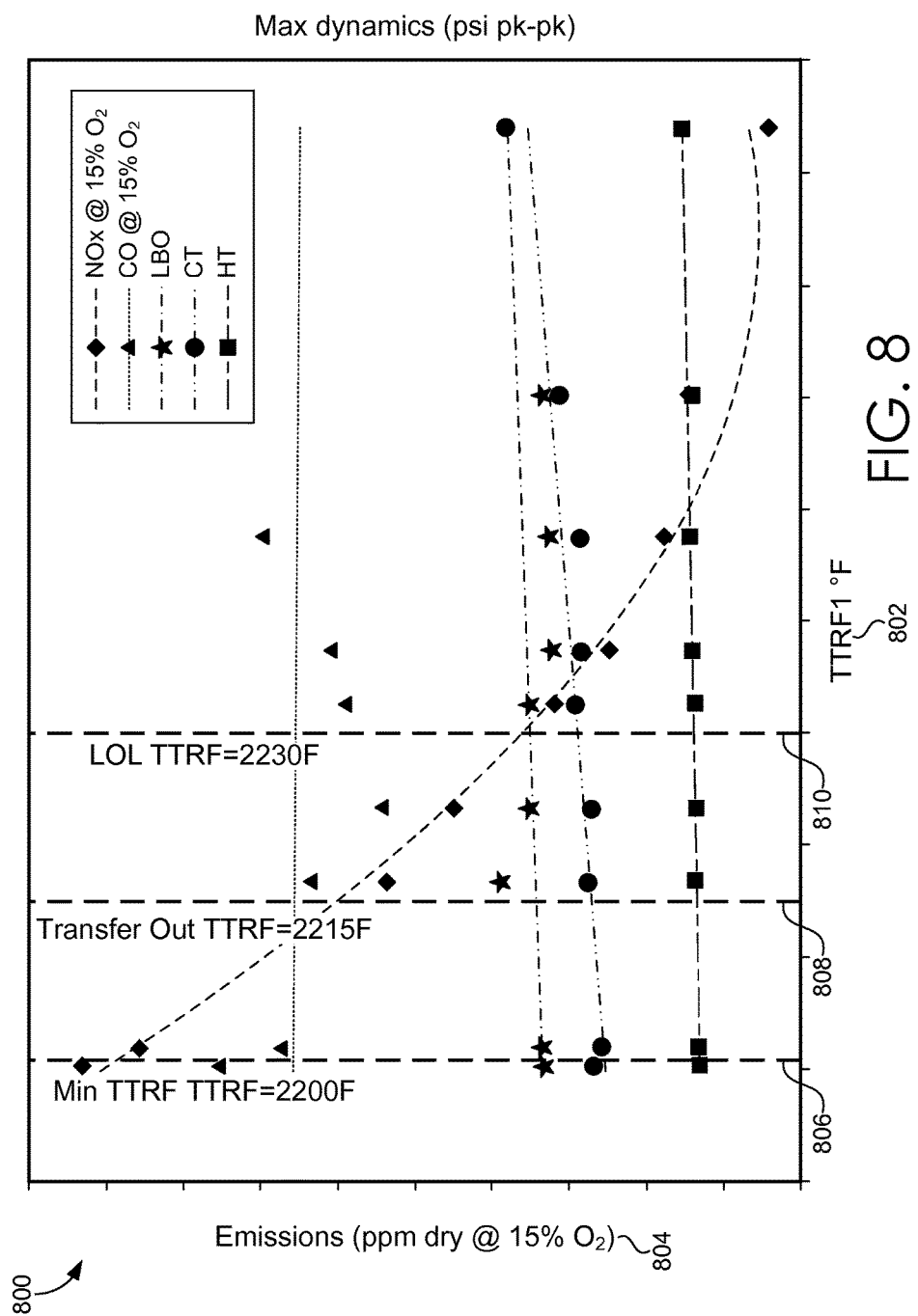
FIG. 8 is a chart showing a graphical representation of a selected minimum TTRF, transfer-out TTRF, and operating load TTRF for a GT engine, including monitored operating criteria, in accordance with an aspect of the present invention.

Referring to FIG. 8, a chart 800 showing a graphical representation of a selected minimum TTRF, a transfer-out TTRF, and a lower operating load TTRF, as well as monitored operating criteria of a GT engine is provided, in accordance with an aspect of the present invention. In FIG. 8, the X-axis 802 shows the turbine reference temperature (TTRF), and the Y-axis 804 shows parts per million emissions. A variety of emissions and dynamics parameters, or criteria, are shown depicted on the graph. These criteria are monitored in order to monitor the emissions and dynamics of the GT engine. These criteria are non-limiting, and additional emissions or dynamics criteria may be considered or included. Three different TTRF set points 806, 808, 810 are shown as vertical lines on the chart. The minimum TTRF 806 is the lowest temperature of the TTRF set points, and is set based on the reasons stated regarding transfer of the fuel mode, flame-out, and other alarm conditions. The transfer-out TTRF 808 is a selected margin higher than the minimum TTRF 806, as described herein. The operating TTRF 810 is the highest of the TTRF set points. The operating TTRF 810 represents the temperature at which the GT engine is best suited to run for an extended period of time in the pre-mixed fuel mode, as described herein. As the AET process is carried out, and the load on the GT engine is reduced, the transfer-out TTRF 808 will be temporarily reduced (i.e., moved to the left), and the operating TTRF 810 will be sequentially lowered as the operating conditions are monitored. As such, when the minimum load turndown TTRF is determined using the method described herein, all of the lines will be moved to the left to correspond to new TTRF set points.

Figure 9:
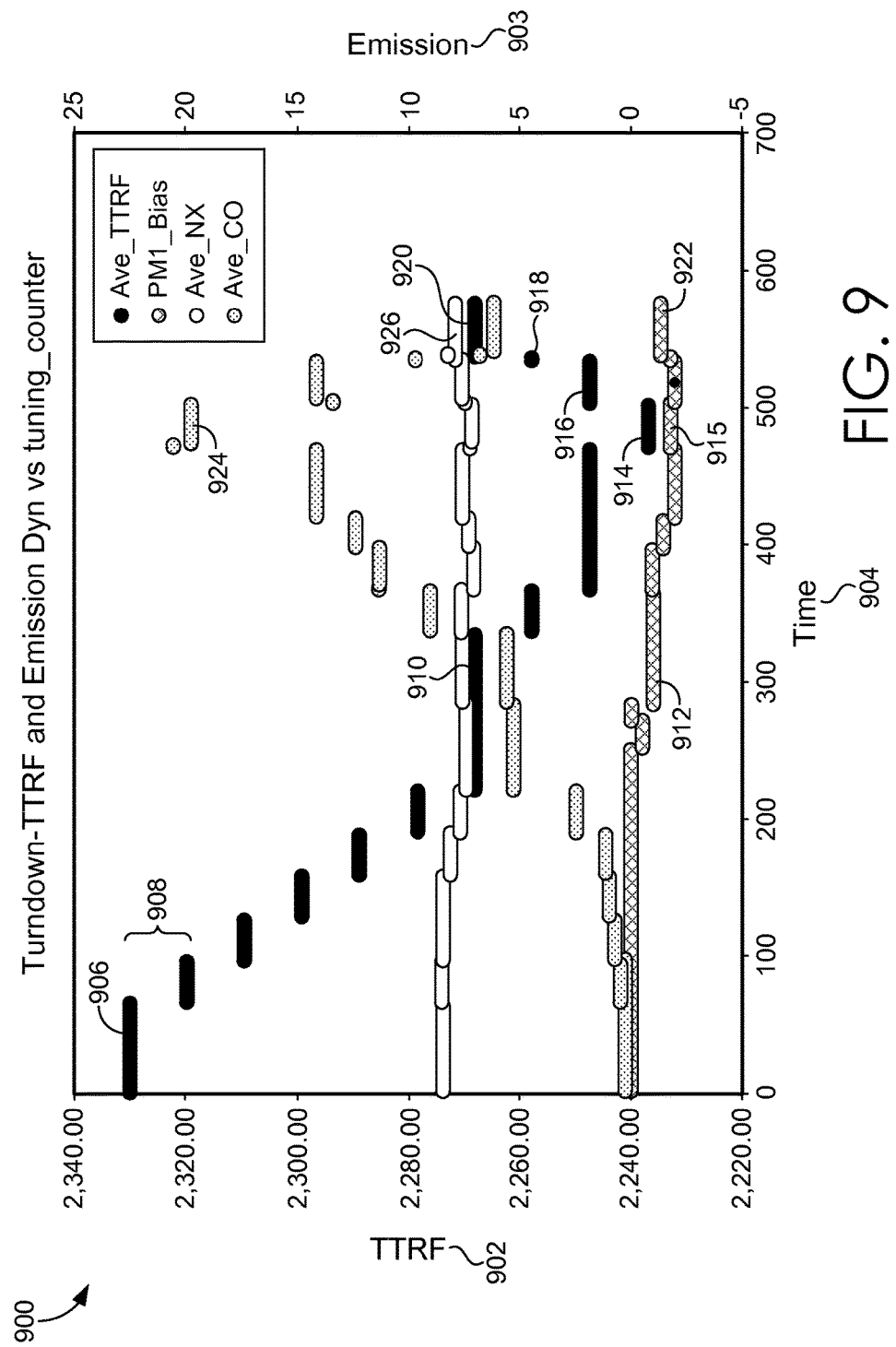
FIG. 9 is a chart showing a graphical illustration of automatic extended turndown with incremental tuning to maintain emission and dynamics of a GT engine, including monitored operating criteria, in accordance with an aspect of the present invention.

Referring to FIG. 9, a chart 900 showing a graphical illustration of AET with an example incremental tuning performed on a GT engine, including monitored operating criteria, is provided, in accordance with an aspect of the present invention. In FIG. 9, the tuning X-axis 904 shows time, the left-side Y-axis 902 shows the GT engine TTRF, the right-side Y-axis 903 shows the level of emissions in parts-per-million associated with the GT engine. At X=0, the starting point, the TTRF 906 is approximately 2330 degrees Fahrenheit. As incremental load reduction is performed on the GT engine, the load is decreased at each step a set amount 908. As the load is decreased, various criteria are monitored to determine if the criteria are within allowable limits. In this example, the criteria are Average NOx 926, Average CO 924, and PM1 bias 922. As long as these criteria are kept within the specified range, AET will continue, making incremental load reductions 908. When the TTRF has been incrementally reduced to a point 910 where a criteria is outside of an allowable limit, incremental tuning 912 is performed by adjusting the PM1 bias (fuel flow split) while holding the TTRF at the point 910. In this instance, the monitored criteria are brought back in-tune with incremental tuning 912 of the PM1 bias, allowing AET to continue. As the load is again reduced, and when the TTRF reaches a point 914 at which a parameter is out of configured limits, the PM1 bias 915 is again adjusted to tune the GT engine. In this case, the PM1 tuning bias 915 is exhausted in its ability to tune the selected load after a selected number of attempts. Subsequently, the load is increased to the last TTRF 916 at which all of the tuning criteria were satisfied, and the GT engine was in-tune. This becomes the new minimum load turndown TTRF 916 for the GT engine. A new transfer-out TTRF 918 is calibrated by adding a first selected tuning margin to the minimum load turndown TTRF 916 and a new operating TTRF 920 is calibrated by adding a second selected tuning margin to the minimum load turndown TTRF 916. At X=600, the GT engine is now in tune, with a new minimum load turndown TTRF 916 established.

A specific, multi-step turndown logic may be used to perform the methods and steps listed. The GT engine needs to be off AGC and the operator must activate the turndown process to find a new minimum load. The system may be paused if the dynamics are out of tune. A call check may be initiated to determine if all of the turndown criteria are allowable. These turndown criteria may include: (1) seeing if the system is working properly, (2) seeing if an alarm limit is reached, (3) checking if tuning limits have been reached, (4) checking if other limits have been reached, and (5) if none of these criteria are in error, denoting that everything is in tune. If a turndown error occurs, the turndown may be canceled/exited, and if no turndown error occurs, but an increased load is required to maintain emissions and dynamics, the load may be increased by one step, and then the process restarted, starting with rechecking the turndown criteria. If tuning is required, tuning is performed three times if the tuning knobs are capable of being moved. If tuning is performed three times or the knobs cannot be moved and the GT engine is still out of tune, the load is increased by one step, and the process is restarted. If the out of tune aspect is cleared by moving the knobs, the process is restarted to determine if an increase or decrease in the load is required. If the tuning limits have been reached, the load may be increased by one step.

If everything is in tune after the above process, one of two options may be followed. If a minimum average TTRF was reached in the previous step, tuning is complete. If the minimum average TTRF was not reached, then average TTRF is decreased. In this aspect, the transfer-out deadband is temporarily modified if a difference between the current average TTRF and the transfer-out TTRF is less than 30 degrees Fahrenheit (user configured), to avoid transfer out of pre-mixed fuel mode when the load is reduced. The load is then reduced by one step. The process is repeated starting at the turndown criteria checking point. After this recursive loop, the minimum average TTRF should be set if no turndown errors are present.

If a turndown error has occurred after the above steps, the minimum average TTRF is checked against the stored minimum TTRF, in which case the minimum average TTRF is updated if the minimum average TTRF is less than the stored minimum TTRF. If the out of tune TTRF is higher than a stored minimum TTRF, then the minimum TTRF is the out of tune TTRF plus 5 degrees (or another selected margin). The minimum TTRF where all turndown criteria were passed is stored as the minimum TTRF for a given CTIM, as discussed above. The transfer-out TTRF is modified by adding a desired safe margin to the minimum TTRF, and the operating TTRF is modified by adding a second desired safe margin higher than the first safe margin to the minimum TTRF. The load on the GT engine is then increased until the difference between the average TTRF and the operating TTRF is the minimum allowed amount. The minimum communicated load corresponds to the average turndown TTRF, and the transfer-out deadband is updated, as discussed above. The new minimum load is displayed on the HMI screen, and tuning is completed. The turndown logic may be repeated recursively until a new minimum load is found. At each point, if no error occurs that ends or cancels the turndown process, the process may repeat recursively from the point where the turndown criteria are checked.

The auto-tune turndown logic may also include flameout avoidance logic. As a representative example of the flameout avoidance logic, the PM1 tuning margin may be set at 3%, the PM1 tuning reserve at 0.5%, and minimum PM1 tuning allowance may be 5%, with a −4% PM1 Bias. The turndown logic is activated when a TTRF is between a user defined maximum turndown TTRF and the minimum TTRF. If the GT engine is out of tune and the PM1 bias is between 0 and −2.5%, standard operation of the GT engine proceeds. If the GT engine is out of tune and the PM1 bias is between −2.5 and −3%, an operator alarm is triggered indicating that auto-tuning is using reserve tuning margin, and indicates that the operator should take the machine off of AGC and activate "find minimum load." If the GT engine is out of tune and the PM1 Bias is between −3% and −4%, the GT engine should be tuned with an extended PM1 bias that corresponds to a lower operating load minimum PM1 valve position. The user may set this value from knowledge of actual minimum PM1 valve position and a margin required between lower operating load and transfer-out point based on manual tuning experience.

As a representative example of automatic flameout avoidance logic by increasing the total fuel ratio, if a GT engine is out of tune and the PM1 bias is less than −4%, an operating alarm should be triggered stating "auto-tune has exhausted reserve tuning margin—entering avoidance mode, take machine off of AGC and push find lower operating load to re-establish lower operating load immediately." If the GT engine is out of tune and the isotherm is increased, auto-tune will automatically call turndown algorithm to re-establish minimum load. The operator is then provided with an alarm "immediate lower operating load avoidance, auto-tune is raising the load, re-establishing lower operating load point."

Various benefits arising from automatic tuning can be realized when automatic tuning is compared against the current tuning processes. That is, because the tuning process of the present invention can be implemented automatically, the disadvantages of manually tuning are overcome. For instance, automatically tuning can be performed quickly and often, which will substantially prevent degradation that would have occurred before the manual tuning. Further, frequently tuning reduces excess pollutants/promotes lower emissions while improving engine life.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. A computerized method, implemented by a processing unit, for automated extended turndown of a combustor of a gas turbine (GT) engine, the method comprising:
   receiving an input to perform the automated extended turndown on the GT engine;
   monitoring one or more turndown criteria of the GT engine to determine if all of the one or more turndown criteria are met;
   upon determining that all of the one or more turndown criteria are met, temporarily reducing a transfer-out turbine reference temperature (TTRF) if a difference between a current TTRF and the transfer-out TTRF of the GT engine is less than a configured amount;
   sending a signal to reduce a load on the GT engine by a specified amount;
   reducing the load on the GT engine by the specified amount based on the signal;
   during and after the load has been reduced, monitoring the one or more turndown criteria to determine if any of the one or more turndown criteria are not met;
   upon determining that at least one of the one or more turndown criteria is not met after the load has been reduced, tuning the load a selected number of times until the at least one turndown criteria is not met the selected number of times; and
   upon the at least one turndown criteria not being met the selected number of times, storing a minimum load turndown TTRF where all turndown criteria have been met for a selected compressor inlet temperature (CTIM).

2. The method of claim 1, wherein upon determining if any of the one or more turndown criteria are met, again reducing the load by the specified amount or a modified specified amount.

3. The method of claim 1, wherein the selected CTIM comprises one or more CTIM ranges.

4. The method of claim 1, further comprising calculating the transfer-out TTRF, the transfer-out TTRF calculated by adding a first selected temperature margin to the minimum load turndown TTRF.

5. The method of claim 4, wherein the first selected temperature margin is selected based on a safety margin.

6. The method of claim 4, further comprising calculating an operating TTRF, the operating TTRF calculated by adding a second selected temperature margin to the minimum load turndown TTRF.

7. The method of claim 6, wherein the second selected temperature margin is greater than the first selected temperature margin.

8. The method of claim 1, wherein the processing unit is configured to transmit the minimum load turndown TTRF.

9. The method of claim 6, wherein the processing unit is configured to check restriction of tuning knobs to a user configured setting.

10. The method of claim 1, wherein the selected number of times comprises the exhaustion of a tuning margin.

11. The method of claim 6, wherein the processing unit is configured to generate an alarm to recheck the minimum load turndown TTRF when the CTIM changes from a first CTIM range to a second CTIM range.

12. The method of claim 1, wherein the turndown criteria comprise at least one of:
   a nitrogen-oxide (NOx) level; a combustor dynamics mode;
   an average carbon monoxide (CO) level; or fuel circuit splits.

13. A system for automated extended turndown, the system comprising:
- a gas turbine (GT) engine including one or more combustors that are each provided with a first minimum turbine reference temperature (TTRF), a first transfer-out TTRF, and a first operating TTRF;
- an auto-tuning controller for carrying out an automated extended turndown process comprising:
  - (a) receiving an input to the perform the automated extended turndown process;
  - (b) monitoring one or more turndown criteria to determine if the one or more turndown criteria are all met;
  - (c) upon determining that the one or more turndown criteria are all met, temporarily reducing the first transfer-out TTRF to a second transfer-out TTRF if a difference between a current TTRF and the first transfer-out TTRF is less than a configured amount;
  - (d) sending a signal to reduce a load on the GT engine by a specified amount;
  - (e) reducing the load on the GT engine by the specified amount based on the signal;
  - (f) during and after the load has been reduced, monitoring the one or more turndown criteria to determine if the any of the one or more turndown criteria is not met;
  - (g) upon determining that any of the one or more turndown criteria is not met during or after the load has been reduced, tuning the load a selected number of times until the turndown criteria that is not met is not met the selected number of times; and
  - (h) upon the turndown criteria that is not met being not met the selected number of times, storing a second minimum TTRF where all turndown criteria are met for a selected CTIM.

14. The system of claim 13, wherein the system further comprises a user input device.

15. The system of claim 14, wherein the system further comprises a user display device configured to receive and display information related to the monitored criteria.

16. The system of claim 13, further comprising a load controller configured to receive commands from the auto-tune controller to increase or decrease a load on the GT engine.

17. The system of claim 13, further comprising calculating a new transfer-out TTRF by adding a first selected temperature margin to the second minimum TTRF.

18. The system of claim 17, further comprising calculating a new operating TTRF by adding a second selected temperature margin to the second minimum TTRF.

19. The system of claim 13, further comprising:
- checking turndown criteria to determine if a tuning limit is reached; and
- determining a new higher minimum TTRF.

20. The system of claim 13, wherein the turndown criteria comprise at least one of:
- a nitrogen-oxide (NOx) level; a combustor dynamics mode;
- an average carbon monoxide (CO) level; or fuel circuit splits.

21. One or more non-transitory computer readable media that, when invoked by computer executable instructions, perform a method for automated extended turndown of a gas turbine (GT) engine, the method comprising:
- monitoring one or more turndown criteria of the GT engine to determine if all of the one or more turndown criteria are met;
- upon determining that all of the one or more turndown criteria are met, temporarily reducing a transfer-out turbine reference temperature (TTRF) if a difference between a current TTRF and the transfer-out TTRF is less than a configured amount;
- sending a signal to reduce a load on the GT engine by a specified amount;
- reducing the load on the GT engine by the specified amount based on the signal;
- during and after the load has been reduced, monitoring the one or more turndown criteria to determine if any of the one or more turndown criteria is not met;
- upon determining that at least one of the one or more turndown criteria is not met after the load has been reduced, tuning the load a selected number of times until the at least one turndown criteria that is not met is not met the selected number of times; and
- upon the at least one turndown criteria that is not met being not met the selected number of times, storing a minimum load turndown TTRF where all of the one or more turndown criteria are met for a selected compressor inlet temperature (CTIM).

* * * * *